United States Patent [19]

Fogell et al.

[11] 4,380,813

[45] Apr. 19, 1983

[54] ERROR CHECKING OF MUTUALLY-EXCLUSIVE CONTROL SIGNALS

[75] Inventors: Leonard L. Fogell, Hyde Park; Samuel R. Levine; Arnold Weinberger, both of Poughkeepsie, all of N.Y.

[73] Assignee: International Business Machines Corp., Armonk, N.Y.

[21] Appl. No.: 249,808

[22] Filed: Apr. 1, 1981

[51] Int. Cl.³ .......................................... G06F 11/12
[52] U.S. Cl. ..................................... 371/52; 371/57
[58] Field of Search .................................. 371/52, 57

[56] References Cited

U.S. PATENT DOCUMENTS

| | | | |
|---|---|---|---|
| 3,614,735 | 10/1971 | Mauger et al. | 371/52 |
| 3,886,520 | 5/1975 | Christensen | 371/52 |
| 4,020,460 | 4/1977 | Jones et al. | 371/57 |
| 4,087,786 | 5/1978 | Lescinsky et al. | 371/52 |

*Primary Examiner*—Charles E. Atkinson
*Attorney, Agent, or Firm*—James E. Murray

[57] ABSTRACT

This error checker determines if more than one set of control signals F1 through FN are on and also flags invalid as opposed to valid situations where none of the control signals F1 to FN are on. To distinguish the invalid from valid situations where none of the control signals F1 to FN are on, an additional control signal $X = \overline{F1} \cdot \overline{F2} \cdot \ldots \cdot \overline{FN}$ is generated and then fed with the control signals F1 to FN through a prior art detector which detects when more than one or none of the control signals X and F1 through FN are on.

5 Claims, 4 Drawing Figures

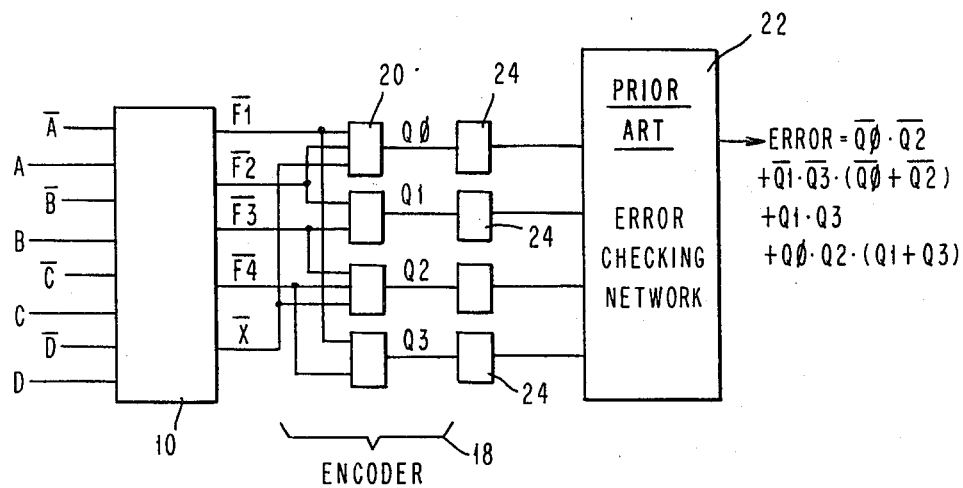

ERROR CHECKING OF MUTUALLY-EXCLUSIVE CONTROL SIGNALS

INTRODUCTION

The present invention relates to a detector for detecting when more than one out of N control signals are on.

In the Jones et al. U.S. Pat. No. 4,020,460, a detector is provided which detects when more than one out of N control signals F1 to FN are on and also checks the situation when none of the N control signals are on. In many applications, there are valid situations where none of the N control signals are on and invalid situations wherein none of the control signals are on. Prior art one out of N checkers, such as the one in Jones et al patent, do not distinguish between these situations and would give an invalid indication in cases where none are warranted.

THE INVENTION

In accordance with the present invention, a one out of N error checker is provided which flags only invalid as opposed to valid situations where none of the control signals F1 to FN are on. To accomplish this, an additional control signal $X = \overline{F1} \cdot \overline{F2} \cdot \ldots \cdot \overline{FN}$ is generated and then fed with the control signals F1 to FN into a detector which detects when more than one or none of the control signals X and F1 through FN are on. Where the control signals F1 to FN and X pass through a number of different logic packages, they can be partially encoded to reduce the number of interpackage connections while permitting error detection to be performed on the encoded signals.

Therefore, it is an object of the present invention to provide a new one out of N error detector.

It is another object to provide a new detector which distinguishes a valid from an invalid situation where none of N signals are on.

It is still another object of the present invention to provide a one out of N detector which allows partial encoding of the control signals.

THE DRAWINGS

These and other objects of the invention will become more apparent by reference to the accompanying drawings of which:

FIG. 3 is a truth table for showing partial encoding of the signals F1 through F4+X of FIG. 1.

FIG. 4 is a block diagram of a second embodiment of the invention incorporating the truth table of FIG. 3.

DETAILED DESCRIPTION

Figure 1:
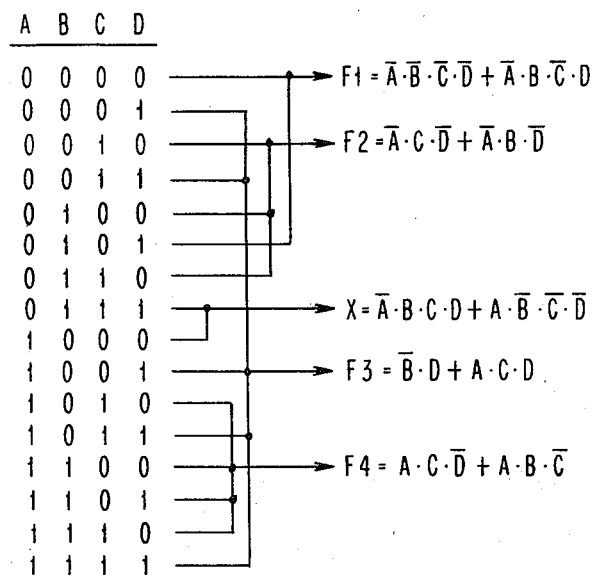
FIG. 1 is a truth table showing the generation of control signals F1 to F4 and X from the set of variables.

The truth table of FIG. 1 shows all possible combinations of four logic variables A, B, C and D used to generate four control signals F1, F2, F3 and F4. The logic expressions for F1 to F4 in terms of A, B, C and D appear alongside the table. From the lines joining the table to the formulas, it should be apparent that there are two sets of minterms in the table of FIG. 1 that were not used to generate the control signals F1 to F4. These are the only valid combinations of states of logic variables A to D when all the control signals F1 to F4 are off. In accordance with the present invention, these two unused sets of minterms are summed together to generate an additional signal X. Thus, all possible minterms of the logic terms A, B, C and D are employed to generate the set of signals consisting of the signal X and the control signals F1 to F4.

Figure 2:
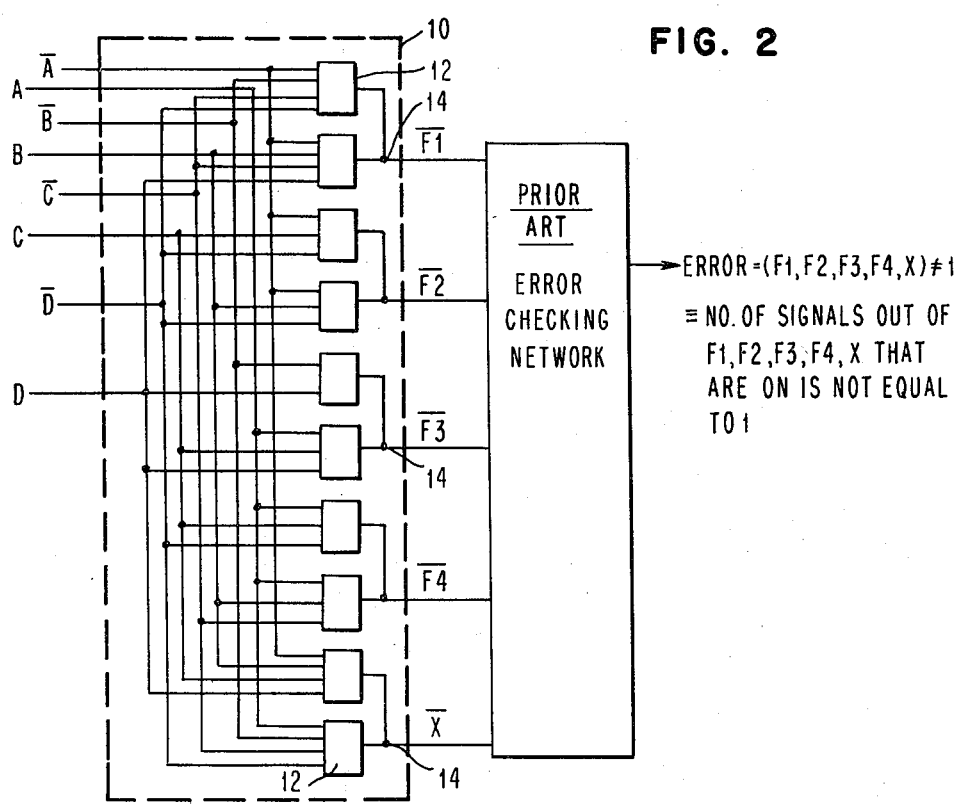
FIG. 2 is a block diagram of one embodiment of the invention incorporating the logic table of FIG. 1.

In FIG. 2, a minimized logic circuit 10 consisting of NANDs 12 and AND-dots 14 logic elements generates signals F1 through F4 and X in complement form. The outputs of this circuit 10 are fed to a prior art error checker 16 such as the one shown in the article entitled "Multiple Selection Detector" on page 2432 of the January 1975 issue of the IBM Technical Disclosure Bulletin or in the aforementioned Jones et al patent. These error checking circuits will provide an error condition only when none of the set of signals X and F1 to F4 is up or when more than one of the set of signals is up.

Sometimes it is necessary to transmit a set of control signals across circuit element boundaries. Encoding of the set of signals reduces the interelement wiring. With proper encoding, checking can be deferred and performed on the encoded signals. The truth tables and formulas of FIG. 3 show how the signals F1, F2, F3, F4 and X are encoded into a 4-bit code, using 5 of the 6 possible combinations of 2 on-bits out of 4. The 11 other possible combinations in the truth table of FIG. 3 are ignored in the encoding, and represent invalid combinations. In FIG. 4, an encoder 18 implementing the formulas of FIG. 3 using NAND logic elements 20, is placed between the circuitry generating the set of signals X and F1 to F4 in accordance with the table of FIG. 1 and a prior art error checking network capable of detecting whether only valid combinations of encoder outputs Q0, Q1, Q2 and Q3 as defined by FIG. 3 are on. The circuit elements 24 are between the output of encoder and the error checking network. As can be seen, any single error in F1, F2, F3, F4 or X or in Q0, Q1, Q2, Q3 will produce an error indication from the detector 22.

In the illustrated example, the savings on interelement wiring is mininal. However, much larger savings are possible using this technique. Complete checking can be provided with partial encoding using other combinations of 2 on-bits out of K. For example, up to 6 signals (5 controls and their X signal) are encoded into 4 signals using the 6 combinations of 2 on-bits out of 4. Similarly, up to 10 signals are encoded into 5 signals using the 10 combinations of 2 on-bits out of 5. Up to 15 signals are encoded into 6 using the 15 combinations of 2 on-bits out of 6, etc. Note that using 3 on-bits out of 6 for complete checking provides the encoding of up to 20 signals. However, the encoder imposes increased loading on the 20 signals.

Therefore it should be understood that many modifications and changes can be made in the illustrated embodiments without departing from the spirit and scope of the invention as represented in the attached claims.

Having thus described our invention, what we claim as new, and desire to secure by Letters Patent is:

1. In apparatus for checking a set of control signals F1 to FN generated from a set of variables a to y for invalid conditions by applying said set of control signals to a detector means which determines when none or more than one of the set of control signals are on, the improvement comprising:

means for generating an additional control signal $X = \overline{F1} \cdot \overline{F2} \cdot \ldots \cdot \overline{FN}$ from the set of variables a to y,
means in said detector means responsive to the additional control signal X to said detector means along with the set of control signals F1 to FN to determine if more than one or none of said control signals F1 to FN and X are on so that said apparatus does not indicate as invalid any valid conditions where none of the control signals F1 to FN are on.

2. The apparatus of claim 1 where,
said means for generating X comprises means generating the sum of all possible minterms of the set of variables a to y not found in generating the functions F1 to FN.

3. The apparatus of claim 1 including
encoding means partially encoding said set of control signals into a lesser number of encoded signals $Q\emptyset, Q1, \ldots, Qn$.

4. The apparatus of claim 3 wherein
said detector means is for detecting whether the valid combinations of said encoded signals $Q\emptyset, Q1, \ldots, Qn$ are on.

5. The apparatus of claim 1 wherein
said control signals X, and F1 to FN are generated in complemented form.

* * * * *